United States Patent [19]

Nickl et al.

[11] 3,969,333

[45] July 13, 1976

[54] MANUFACTURE OF COPOLYMERS OF 4-METHYLPENTENE-1

[75] Inventors: Johann Nickl, Bad Durkheim; Hans Schick, Mannheim; Heinz Mueller-Tamm, Ludwigshafen, all of Germany

[73] Assignee: BASF Aktiengesellschaft, Ludwigshafen (Rhine), Germany

[22] Filed: Feb. 6, 1975

[21] Appl. No.: 547,636

[52] U.S. Cl. .............................. 526/154; 526/350; 526/905
[51] Int. Cl.² .................... C08F 2/38; C08F 4/52; C08F 210/00; C08F 210/14
[58] Field of Search ................. 260/88.2 B, 88.2 F, 260/93.7

[56] References Cited
FOREIGN PATENTS OR APPLICATIONS
1,520,146  12/1970  Germany ....................... 260/88.2 F
1,145,886  3/1969  United Kingdom ............ 260/88.2 F
849,090  9/1960  United Kingdom ................ 260/88.2

*Primary Examiner*—Alan Holler
*Attorney, Agent, or Firm*—Johnston, Keil, Thompson & Shurtleff

[57] ABSTRACT

Copolymers of 4-methylpentene-1 are prepared by copolymerization of 4-methylpentene-1 with one or more other $C_{2-18}$ α-alkenes at a temperature above room temperature and in the presence of hydrogen using a Ziegler/Natta catalyst system. The polymerization is carried out at a relatively very high temperature and in the presence of an inert gas with the proviso that the partial pressures of the inert gas and of the hydrogen and the sum of the partial pressures of the inert gas, hydrogen and 4-methylpentene-1 have specific values. In this way, copolymers having large crystalline fractions are obtained in a high yield per unit of catalyst system per unit time.

5 Claims, No Drawings

MANUFACTURE OF COPOLYMERS OF 4-METHYLPENTENE-1

This application discloses and claims subject matter described in German patent application No. P 24 06 901.0, filed Feb. 14, 1974, which is incorporated herein by reference.

The present invention relates to a process for the manufacture of copolymers of 4-methylpentene-1 containing up to 10 polymerized units of one other $C_{2-18}\alpha$-alkene per 100 units of 4-methylpentene-1, by weight, by copolymerization of 4-methylpentene-1 with one or more other $C_{2-18}\alpha$-alkenes at (1) a temperature above room temperature and (2) in the presence of hydrogen and using (3) a Ziegler/Natta catalyst system consisting of (3.1) a titanium trichloride component and (3.2) an alkyl aluminum component, the atomic ratio of titanium in the catalyst component (3.1) to aluminum in the catalyst component (3.2) being from 1:1 to 1:100.

The known processes of this kind are carried out at relatively low temperatures to ensure that the products exhibit maximum crystallinity. This is in accordance with a teaching, which can be traced back to Natta, that in polymerizations using Ziegler/Natta catalysts, the stereospecificity of the catalyst system and thus the crystallinity of the polymers obtained decreases relatively rapidly with rising polymerization temperature and vice versa. (See for example G. Natta, Journal of Polymer Science, Vol. 34 (1959), pp. 531 et seq., "Properties of Isotactic, Atactic and Stereo Block Homopolymers, Random and Block Copolymers of $\alpha$-Olefins".) When operating in this manner in the known processes, copolymers of 4-methylpentene-1 are obtained which have satisfactory to good properties. However, one drawback of the prior art processes is that only relatively small amounts of polymer are produced per unit of catalyst system per unit time.

It is an object of the present invention to provide a process of the kind defined above which suffers from the above drawback either not at all or to a considerably lesser degree.

We have found that the above object is achieved by carrying out the process at relatively high temperatures hitherto virtually unknown for Ziegler/Natta catalyst systems and, as a further essential feature, by effecting polymerization in the presence of specific inert gases under a specific total pressure of the polymerization system and specific partial pressure relationships between the inert gas and hydrogen.

The process defined above, unlike other processes of this type, surprisingly produces products of which the crystallinity is the same or virtually the same as that of similar products obtained at considerably lower temperatures and in the absence of inert gas.

Thus the present invention relates to a process for the manufacture of copolymers of 4-methylpentene-1 containing up to 10 and in particular from 0.5 to 5.0 polymerized units, by weight, of one other $C_{2-18}\alpha$-alkene per 100 units, by weight, of 4-methylpentene-1 by copolymerization of 4-methylpentene-1 with one other $C_{2-18}\alpha$-alkene at (1) a temperature above room temperature and (2) in the presence of hydrogen using (3) a Ziegler/Natta catalyst system consisting of (3.1) a titanium trichloride component and (3.2) an alkyl aluminum component, the atomic ratio of titanium in catalyst component (3.1) to aluminum in catalyst component (3.2) being from 1:1 to 1:100 and in particular from 1:3 to 1:40. The process of the invention is characterized in that the polymerization is carried out a. at a temperature of from 90° to 150°C and in particular from 110° to 130°C, b. in the presence of an inert gas consisting or composed of nitrogen, helium, neon, argon and/or krypton, c. at a partial pressure $(c_1)$ of the inert gas of 0.1 to 17 and in particular from 1 to 5 atmospheres absolute and a partial pressure $(c_2)$ of the hydrogen of from 0.01 to 10 and in particular from 0.1 to 2 atmospheres absolute, with the proviso $(c_3)$ that the sum of the partial pressures of inert gas, hydrogen and 4-methylpentene-1 is from 3 to 20 and in particular from 8 to 10 atmospheres absolute.

This process produces copolymers of 4-methylpentene-1 not only in a more than proportionately increased yield (per unit of catalyst system per unit time) which yield is at a maximum at temperatures of from about 110° to about 130°C, but also showing a relatively high crystallinity satisfying industrial requirements for various applications.

The process itself may be carried out in conventional manner within the definition given above, apart from the characterizing features of the invention, for example continuously or batchwise and in the presence or absence of liquid diluents and, in particular, in the presence of liquid excess mixture of 4-methylpentene-1 and comonomer as polymerization medium. To avoid, in this specification, superfluous descriptions of the methods of carrying out conventional processes of this kind, it is pointed out that the process of the invention may be carried out as described, for example, in German Industrial Patent (GDR) 15,050, German published applications Nos. 1,217,071, 1,420,503, 1,520,129 and 1,520,307 and U.K. Pat. No. 849,090 with appropriate changes to make allowance for the special features of the present invention.

The following remarks relate to the individual features of the process of the invention.

A. Preferred comonomers for copolymerization with the 4-methylpentene-1 are butene-1, hexene-1, decene-1 and hexadecene-1. Other suitable comonomers are for example etylene, ethylene, and octene-1. The comonomer may suitably be a mixture of two or more $C_{2-18}$-alkenes.

B. Suitable titanium trichloride components (3.1) of the Ziegler/Natta catalyst system (3) are the conventional components of this kind, although the following components have proved particularly successful in the present context:

$B_1$. Complexes of the formula $TiCl_3 \cdot \frac{1}{3} AlCl_3$ and the component $TiCl_3$ obtained by reducing $TiCl_4$ with hydrogen, $B_2$. titanium compounds of the kind mentioned under ($B_1$) modified with electron donors. The electron donors may be those commonly used in Ziegler/Natta catalyst systems. Examples of suitable donors are those described in French Patent No. 1,231,089 or U.S. Pat. No. 3,186,977.

Particularly suitable donors for the present purpose have been found to be tributylphosphine, triphenylphosphine, triphenylphosphine oxide, $\gamma$-picoline and hexamethylphosphoric triamide.

It has also been found advantageous to select the amounts of titanium compound of the kind mentioned under ($B_1$) and the electron donor such that the molar ratio of these substances is from 1:0.1 to 1:1 and preferably from 1:0.1 to 1:0.4 and to unite these two substances by intense milling or prolonged heating of the mixture thereof in a hydrocarbon as suspension medium in conventional manner.

C. The alkyl aluminum component (3.2) of the Ziegler/Natta catalyst system may also be one known in the art, particularly suitable compounds being those of the general formulae $AlR^3$ and $AlR^2Cl$ (where $R = C_{1-10}$ alkyl). The following compounds have been found to be particularly suitable for the purpose of the invention: diethyl aluminum chloride, ethyl aluminum sesquichloride and diisobutyl aluminum chloride.

D. The hydrogen partial pressure in the polymerization system may be increased if it is desired to decrease the molecular weight of the polymer, and vice versa.

E. Of the inert gases named, nitrogen and argon are particularly suitable.

The copolymers obtained in the present process are valuable starting materials for the manufacture of shaped articles such as injection moldings in the form of, say, laboratory vessels and clinical articles. They are transparent and heat-resistant up to a temperature of about 150°C.

EXAMPLES 1 to 4

The following ingredients are placed in a stirred autoclave having a capacity of 1 liter and provided with heating and cooling means:

α

350 g of 4-methylpentene-1 and
25 g of butene-1 (for Example 1) or
350 g of 4-methylpentene-1 and
30 g of hexene-1 (for Example 2) or
350 g of 4-methylpentene-1 and
15 g of octene-1 (for Example 3) or
350 g of 4-methylpentene-1 and
20 g of decene-1 (for Example 4) or
350 g of 4-methylpentene-1 and
20 g of decene (for the first comparative test) or
350 g of 4-methylpentene-1 and 15 g of octene-1 (for the second comparative test)

(β) diethyl aluminum chloride (DEAC) in an amount (in g) listed in the Table below and (γ) a titanium trichloride component (TTCC) obtained by milling $TiCl_3 \cdot \frac{1}{3} AlCl_3$ with tributylphosphine in a molar ratio of 1:0.17 for seven hours in a vibratory ball mill, the amount used of this component being listed (in g) in the Table below together with the atomic ratio of titanium in the titanium trichloride component (3.1) to aluminum in the alkyl aluminum component (3.2) (Ti : Al).

Polymerization is carried out with stirring at a temperature (PT, in °C), as given in the Table below. The Table also lists the type of inert gas (I) used ($N_2$ or Ar) and the partial pressures of the inert gas ($P_I$, in atmospheres absolute) and hydrogen ($P_{H2}$, in atmospheres absolute) and the sum of the partial pressures ($\Sigma P$, in atmospheres absolute) of the inert gas, hydrogen and 4-methylpentene-1. The duration of polymerization is two hours in all cases.

The polymer is isolated by venting the autoclave and cooling its contents to about 25°C followed by precipitation of the polymer with 400 g of methanol, filtration and washing of the precipitate with 300 g of methanol. The precipitate is dried for five hours at 70°C to give a white polymer powder. The yield of polymer (YP in g) and the catalyst efficiency (CE in g of polymer per g of titanium trichloride component) and the intrinsic viscosity [η] of the polymer (determined according to DIN 53,726 in g/dl) and the heptane-insolubility of the polymer (HI in %) as a measure of the degree of crystallinity and measured with 2.5 g of polymer in 350 g of heptane at 98°C, are also listed in the Table below, and also the amount of polymerized units of comonomer (Com in % w/w).

TABLE

| Example | DEAC | TTCC | Ti:Al | PT | I | ΣP | $P_I$ | $P_{H2}$ | $PY_{(u)}$ | CE | [η] | HI | Com |
|---|---|---|---|---|---|---|---|---|---|---|---|---|---|
| 1 | 0.95 | 0.060 | 1:31 | 120 | $N_2$ | 12.0 | 1.3 | 1.0 | 249 | 4150 | 1.8 | 62.6 | 2.1 |
| 2 | 0.90 | 0.055 | 1:32 | 120 | $N_2$ | 10.0 | 1.5 | 0.5 | 242 | 4400 | 2.4 | 61.0 | 5.0 |
| 3 | 0.90 | 0.050 | 1:35 | 110 | $N_2$ | 9.0 | 1.8 | 0.5 | 200 | 4000 | 2.3 | 64.8 | 2.2 |
| 4 | 0.90 | 0.050 | 1:35 | 120 | Ar | 10.0 | 3.6 | 0.5 | 198 | 3950 | 2.3 | 72.0 | 3.2 |
| X) | 0.90 | 0.055 | 1:32 | 120 | — | 6.4* | — | 0.5 | 154 | 2800 | 2.4 | 67.5 | 3.0 |
| XX) | 0.95 | 0.050 | 1:37 | 110 | — | 5.7* | — | 0.5 | 130 | 2600 | 2.3 | 66.8 | 2.2 |

X) first comparative test
XX) Second comparative test
*only sum of partial pressures of hydrogen and 4-methylpentene-1 due to absence of inert gas

We claim:

1. A process for the manufacture of copolymers of 4-methylpentene-1 containing up to 10 polymerized units, by weight, of one or more other $C_{2-18}$ α-alkene per 100 units, by weight, of 4-methylpentene-1 by copolymerization of a liquid excess of the mixture of 4-methylpentene-1 with one or more other $C_{2-18}$ α-alkenes at (1) a temperature above room temperature and (2) in the presence of hydrogen using (3) a Zeigler/Natta catalyst system consisting of (3.1) a titaium trichloride component and (3.2) an alkyl aluminum component, the atomic ratio of titanium in catalyst component (3.1) to aluminum in catalyst component (3.2) being from 1:1 to 1:100, wherein polymerization is carried out a. at a temperature of from 90° to 150°C,
b. in the presence of an inert gas consisting of nitrogen, helium, neon, argon or krypton or a mixture thereof, and
c. at a partial pressure ($c_1$) of inert gas of from 0.1 to 17 atmospheres absolute and a partial pressure ($c_2$) of hydrogen of 0.01 to 10 atmospheres absolute, with the proviso ($c_3$) that the sum of the partial pressures of inert gas, hydrogen and 4-methylpentene-1 is from 3 to 20 atmospheres absolute.

2. A process as set forth in claim 1 wherein said inert gas is nitrogen.

3. A process as set forth in claim 1 wherein said inert gas is argon.

4. A process as set forth in claim 2 wherein said reaction temperature is from 110° to 130°C.

5. A process as set forth in claim 2 wherein the sum of the partial pressure is from 8 to 10 atmospheres absolute.

* * * * *